United States Patent [19]

Muraz et al.

[11] 4,114,438
[45] Sep. 19, 1978

[54] DEVICES FOR MEASURING THE FLOW SPEED OF A FLUID

[75] Inventors: Jean-Max Muraz; Michel Payre; Pierre Rampin, all of Valence, France

[73] Assignee: Crouzet, Paris, France

[21] Appl. No.: 748,495

[22] Filed: Dec. 8, 1976

[30] Foreign Application Priority Data

May 22, 1978 [FR] France .............................. 78 37893

[51] Int. Cl.² .............................................. G01F 1/66
[52] U.S. Cl. .................................... 73/194 A; 73/189
[58] Field of Search ............................. 73/189, 194 A

[56] References Cited

U.S. PATENT DOCUMENTS

| | | | |
|---|---|---|---|
| 3,336,801 | 8/1967 | Snavely | 73/194 A X |
| 3,898,878 | 8/1975 | Stallworth et al. | 73/194 A X |
| 3,918,304 | 11/1975 | Abruzzo et al. | 73/194 A |
| 3,978,726 | 9/1976 | Shih | 73/189 |

Primary Examiner—Charles A. Ruehl
Attorney, Agent, or Firm—Marmaduke A. Hobbs

[57] ABSTRACT

Device for measuring the flow speed of a fluid, comprising sound wave transmitting-receiving probes placed in the fluid flow, wave generating means, transforming means for exploiting the electrical signals, such as amplifiers, counting circuits and integrating circuits, characterized in that a plurality of integrators with variable time constant are periodically put to zero once their outputs have been sampled, said operations being made by analog switches.

2 Claims, 6 Drawing Figures

DEVICES FOR MEASURING THE FLOW SPEED OF A FLUID

The present invention relates to devices for measuring the flow speed of a fluid by means of sound waves.

In the already known devices of this type, such as that disclosed in French Pat. No. 69.41 949 (2,070,438) of Dec. 4, 1969, to P. ALAIS and J. GIRVES, two sound wave transmitting-receiving probes are placed face to face in the fluid flow whose speed is to be measured. Generating means provide for simultaneously transmitting from both probes a succession of sound waves during a time inferior to the times needed by said waves to cover the distance separating both probes, which are thereafter used as receiving probes in order to measure the phase shift existing between the reception signals detected by each probe.

The object of the present invention is to improve the exploiting means for the signals received by the probes in order on the one hand to increase the accuracy of the measurements by compensating the sound celerity ($C^2$) and on the other hand to enable the calculation of a fluid speed on various channels by multiplexing the calculation system on a plurality of pairs of probes, without increasing for all that the data processing means as was necessary in French Pat. No. 69.41 949 (2,070,438).

To this effect, the present invention relates to a device for measuring the flow speed of a fluid, comprising sound wave transmitting-receiving probes placed in the fluid flow, wave generating means, transforming means for exploiting the electrical signals, such as amplifiers, counting circuits and integrating circuits, characterized in that a plurality of integrators with variable time constant are periodically put to zero once their outputs have been sampled, said operations being made by analog switches.

In order to measure the fluid flow speed along two perpendicular axes OX and OY, such as is the case in the manufacture of a current-meter, the device comprises two pairs of probes $X_1X_2$ and $Y_1Y_2$ whose alignments are at right angles.

An associated magnetic compass provides information on the orientation of said axes in relation to North.

A "programmer" clock allows to deliver in synchronism successively with the transducer pairs $X_1X_2$ and $Y_1Y_2$, impulse trains whose total life time is inferior to the sound propagation time in the space separating the probes. The transducers operate thereafter as receivers and the $t_1$ and $t_2$ transit times are compared in both directions between each pair of probes.

For a given measuring axis $X_1X_2$, if $\alpha$ is the angle formed by vector V representing the flow speed of a fluid in relation to said axis, and if the speed to measure is small compared to the celerity c of sound in the medium in consideration, the following formula may be applied:

$$V \cos \alpha = (C^2/2d) \Delta t$$

wherein $\Delta t = t_2 - t_1$ is the phase shift between the two waves received on probes $X_1$ and $X_2$ operating as receivers, and d is the distance between said probes. This result shows the influence of sound celerity c on measurement accuracy; in order therefore to be free of this factor, the device is equipped with an electronic card called "celerity compensation card". The object of the device is to calculate the fluid speed V with the following formula:

$$V \cos \alpha = (d/2) (\Delta t/t_1 t_2)$$

wherein term c does not appear and the influence of the variations of c on the measurement of V may be eliminated.

The figures of the accompanying drawing illustrate by way of example an embodiment of the current-meter according to the present invention, wherein FIG. 1 is a vector diagram for the resolution of the fluid speed V in relation with the axis of a pair of probes $X_1X_2$;

Figure 1:
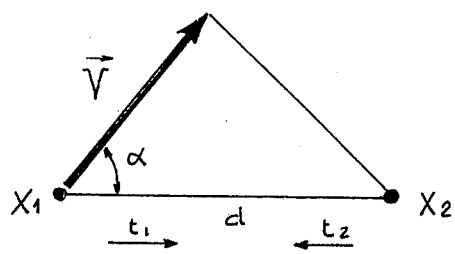

On FIG. 1, the transmitting-receiving probes $X_1$ and $X_2$, spaced apart by a distance $d = 20$ cm about, determine the X-axis. Vector V represents the flow speed of a fluid forming an angle $\alpha$ with the X-axis. If $t_1$ and $t_2$ are the transit times of the sound wave from one probe to the other in both directions, $\Delta t$ represents the shift $t_2 - t_1$.

Using formula:

$$V \cos \alpha = (d/2) (\Delta t/t_1 t_2)$$

the calculation of $V \cos \alpha$ may be made in three stages:
(1) Calculation of $K/t_1 t_2$, or celerity compensation;
(2) Bringing $\Delta t$ in evidence, summation of $m$ elementary measurements;
(3) Calculation of $K/t_1 t_2 \, m. \Delta t$.

Figure 2:
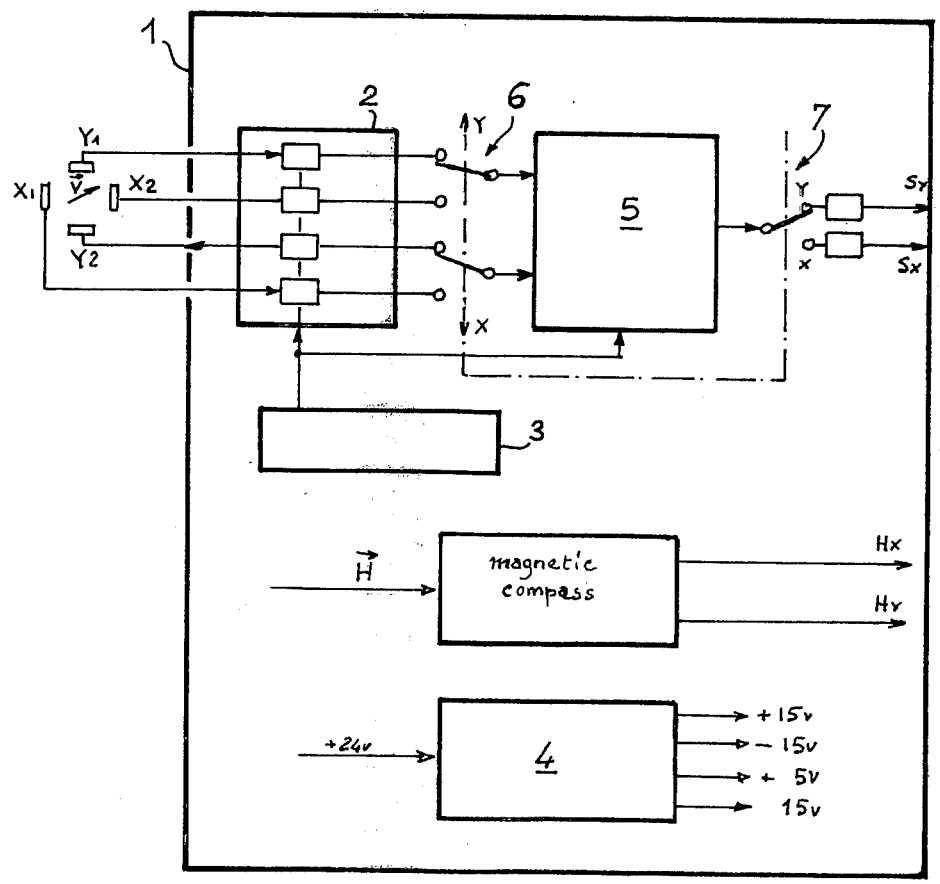
FIG. 2 is a block schematic diagram of the current-meter according to the invention.

To this effect, the "current-meter" device comprises two pairs of probes $X_1X_2$ and $Y_1Y_2$ placed at a distance sufficient from a leak-free stainless steel box 1 (FIG. 2) containing the electronic equipment, to render the turbulences negligible.

This box contains the various electronic cards necessary for the designing and processing of the electrical signals such as:
2. Transmission-reception card;
3. Programming card;
4. Supply card;
5. Analog calculation and celerity compensation cards.

The measurements are performed in succession on the various pairs of probes by multiplexing 6 and 7.

Figure 3:
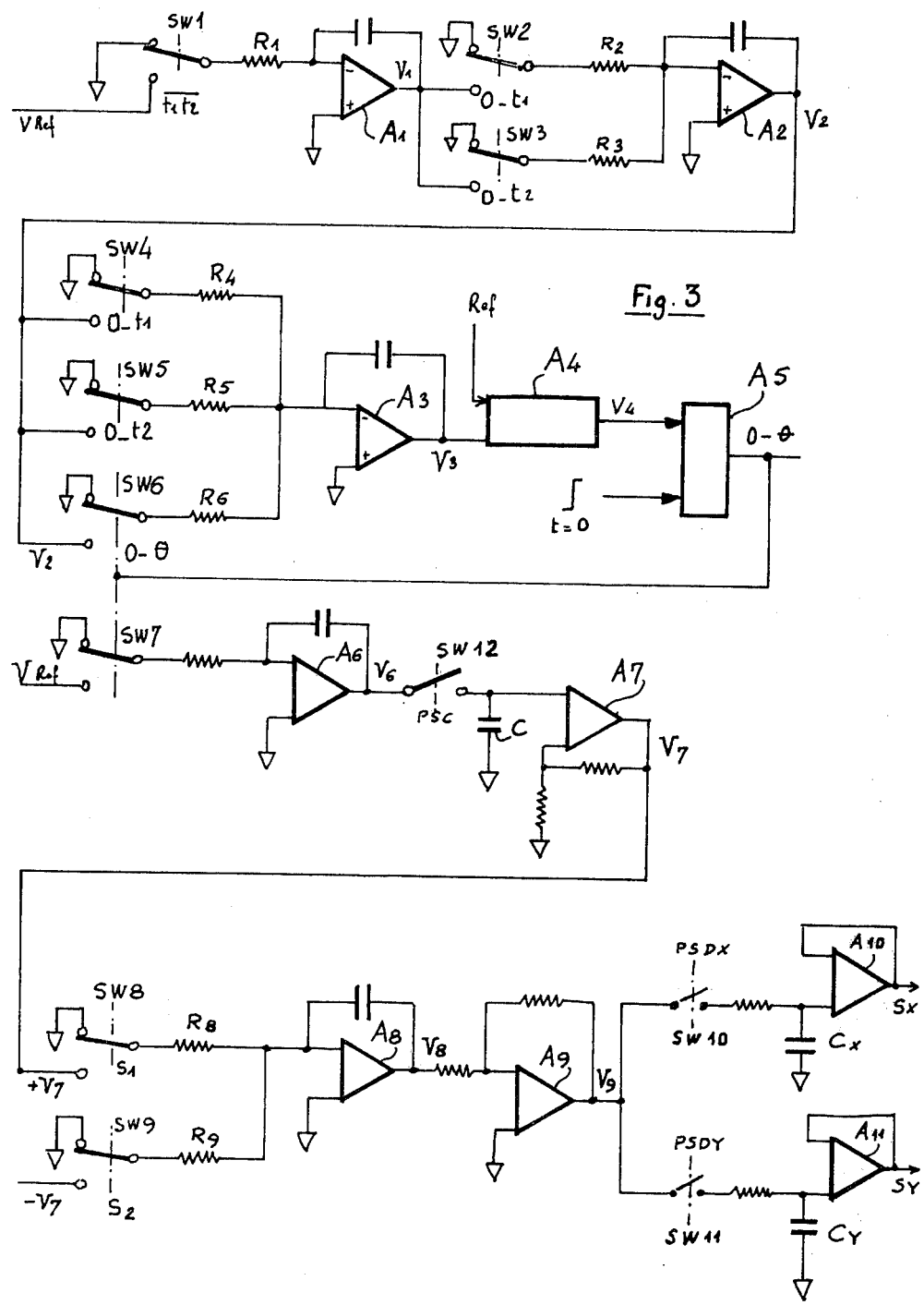
FIG. 3 is an electric diagram of the celerity compensation card.

The celerity compensation consists in creating a square wave crenel of width $\theta = K/t_1 t_2$ then a voltage $V = K'/t_1 t_2$, by means of diagram of FIG. 3.

Square wave crenels 0-$t_1$ and 0-$t_2$ are created by known means by trigger circuits put in state 1 at moment 0 by starting high frequency SHF, and put back to state 0 in the fore front of the reception signals. Signal $\overline{t_1 t_2}$ represents the smallest square wave crenel 0-$t_1$ or 0-$t_2$.

Supposing for instance $(0-t_1) < (0-t_2)$, voltage V is integrated from 0 to $t_1$ (signal $\overline{t_1 t_2}$), and signal $V_1$ is obtained in the shape (V ref/$\tau$).$t$, with a final value of (V Ref/$\tau$)$t_1$.

A voltage proportional to $t_1 t_2$ is created in the following manner:

From 0 to $t_1$, both switches Sw2 and Sw3 are in their lower position. Resistors R2 and R3 are then parallel. $V_1$ is then integrated from 0 to $t_1$ with a time constant $\tau/2$.

The final value at moment $t_1$ is:

$$V_2 = \frac{2}{\tau} \int_0^{t_1} \frac{V \text{ ref}}{\tau} t \, dt = \frac{V \text{ ref}}{\tau^2} t_1^2.$$

Between $t_1$ and $t_2$, constant V ref $t_1/\tau$ is integrated with time constant $\tau$.

$$V''_2 = \frac{1}{\tau} \int_{t_1}^{t_2} V \text{ref} \frac{t_1}{\tau} dt = \frac{V \text{ref}}{\tau^2} t_1 (t_2 - t_1)$$

at moment $t_2$, the position is then $V'_2 + V''_2 = (V \text{ref}/\tau^2) t_1 t_2$. A square wave crenel of width $\theta$ is created in the following manner:

Trigger circuit 0-$\theta$ $A_5$ is put at 0 at moment 0 (beginning of the transmission) and $V_2$ is thereby connected through Sw6. From 0 to $t_1$, $V_2$ is integrated with a time constant $\tau_1$, ($R_4$, $R_5$, $R_6$ in parallel). From $t_1$ to $t_2$, $V_2$ is integrated with a time constant $\tau_2$, ($R_5$ and $R_6$ in parallel). From $t_2$ to $\theta$, $V_2$ is integrated with a time constant $\tau_3$ ($R_6$ alone).

The output voltage of the integrator is compared with a reference. When this threshold has been reached, the comparator is on $+V$ max. The trigger circuit shifts to state 1 and stops the integration (Sw6 in the upper position).

Voltage $V_3$ at moment $\theta$ has following shape:

$$(a - b) t_1^3 + (c - d) t_1 t_2^2 + e. \, t_1 t_2 \theta.$$

Figure 5:
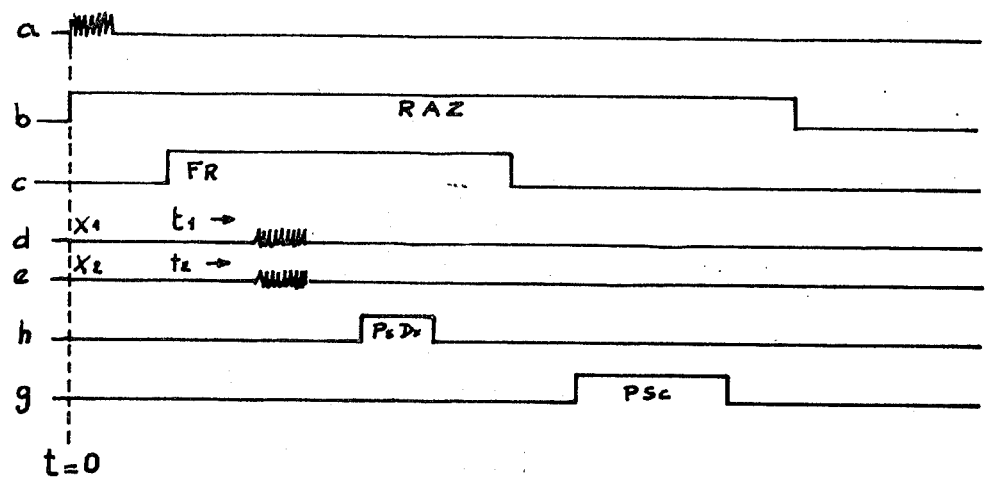
FIG. 5 is a transmission, reception and control chronogram.

An appropriate choice of the time constants allows to cancel the terms in $t_1^3$ and in $t_1 t_2^2$ in order to keep only the term in $t_1 t_2 \theta$. The result is then: $t_1 t_2 \theta = $ constant, and therefore $\theta = K/t_1 t_2$ FIG. 5 is a transmission-reception and control chronogram wherein:

a is the transmission signal, b is the back to zero signal for $A_1$, $A_2$, $A_3$, $A_6$ (at the lower level) and the initialization signal for trigger circuit $A_5$ (positive front $t = 0$), c is the back to zero signal for $A_8$ (at the lower level), the positive bridge setting the minimum propagation time, d, e are the reception signals, f is the output sampling control X (or Y ... or n), g is the sampling control for the scale factor (PSC).

A voltage proportional to $K/t_1 t_2$ is created in the following manner:

Square wave crenel $\theta$ is integrated by amplifier $A_6$. The celerity sampling signal PSC permits storing of the final result of the integration. Voltage $V_6$ represents therefore factor $K/t_1 t_2$. The same result is obtained with voltage $V_7$ maintained by amplifier $A_7$ and capacitor C.

After storing this scale factor, integrators $A_1$, $A_2$, $A_3$ and $A_6$ are put back to zero.

Figure 6:
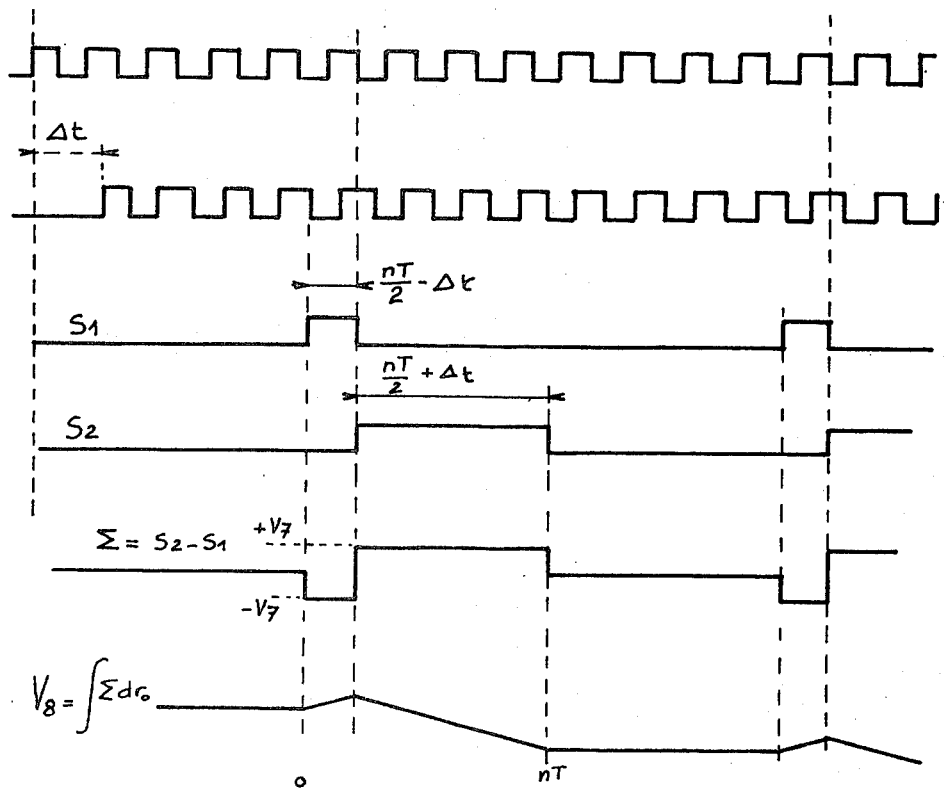
FIG. 6 is a chronogram for the measurement of $m.\Delta t$.

$\Delta t$ is emphasized and m elementary measurements are summated as follows (FIG. 6):

$\Delta t$: phase shift between the two received wave trains.

After dividing the frequency of these wave trains by a number 2n, and shifting the phase of a signal in relation to the other, signals $S_1$ and $S_2$ are obtained:

$S_1$: m square wave crenels of width $(nT/2) - \Delta t$ $S_2$: m square wave crenels of width $(nT/2) + \Delta t$ The periodicity of $S_1$ and $S_2$ is therefore 2 $nT$.

Parameters m and n are determined by a counting operation with known means such as those cited in French Pat. No. 2,070,348.

Integration (analog calculation card):

Let us call "moment 0" the beginning of square wave crenel $(nT/2) - \Delta t$ and let us determine the shape of the integrator input signal obtained by resistors $R_8$ and $R_9$.

Before moment 0, $S_1$ and $S_2$ are at 0,

Between 0 and $(nT/2) - \Delta t$, Sw8 is in the higher position and Sw9 is in the lower position.

Between $(nT/2) - \Delta t$ and $nT$, Sw8 is in the lower position and Sw9 is in the higher position. $R_8$ and $R_9$ perform a summation.

After a time $nT$, the result is:

$$V_8 = \frac{1}{\tau} \int_0^{\frac{nT}{2} - \Delta t} - V_7 dt + \frac{1}{\tau} \int_{\frac{nT}{2} - \Delta t}^{nT} + V_7 dt$$

$$= \frac{V_7}{\tau} (- \frac{nT}{2} + \Delta t + nT - \frac{nT}{2} + \Delta t) = \frac{V_7}{\tau} (2 \Delta t)$$

Integration on m periods:

The integration of m signals gives $2V_7/\tau \, m. \, \Delta t$ which is in the shape of $K \, \Delta t/t_1 t_2$ and represents therefore the "C cos $\alpha$" speed requested.

During PSDx, signal sampling on channel x, the integrator output voltage (after $A_9$) is stored in capacitor Cx to give signal Sx.

During PSDy, signal sampling on channel y, the output voltage is stored in capacitor Cy to give signal Sy.

Integrator $A_8$ is brought back to zero at the end of reception window (RW).

Amplifiers $A_{10}$ and $A_{11}$ provide output signals Sx − Sy under low impedance.

The calculation on each channel of scale factor $K/t_1 t_2$ and its application on switch $A_8$ to the following measurement on the same channel provides separation of the measurements on the various channels. The only imperative is that the propagation times occuring during the various measurements be of the same order of magnitude. With this system, it is possible, in fluid flow-metering for instance, to operate measurements by multiplexing on n channels with one calculation circuit only.

Figure 4:
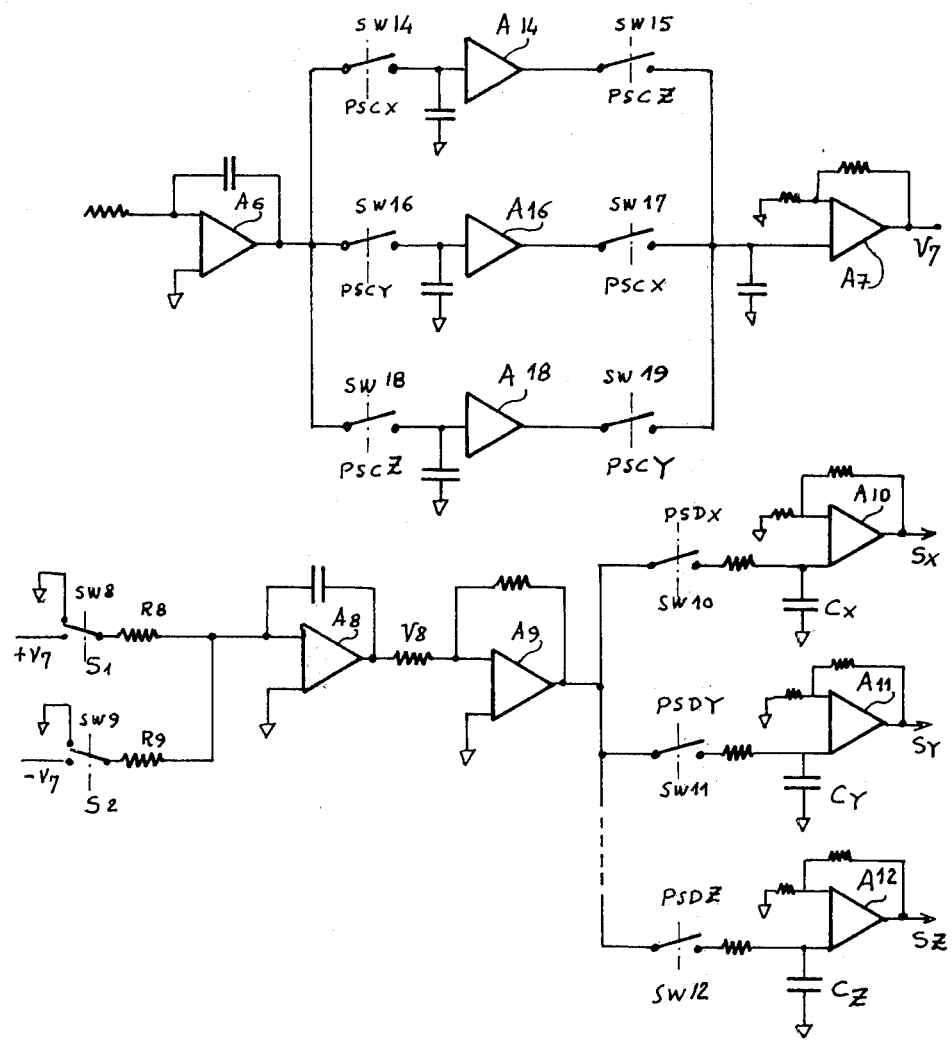
FIG. 4 is a complementary electric diagram for three measuring channels.

FIG. 4 is a diagram, by way of example, of $n = 3$ measurement channels.

In this case, the result of the calculation of the scale factor made on one measuring channel (x for instance) is taken out and stored in an intermediate memory $A_{14}$ by a switch Sw14 whereas simultaneously, the scale factor previously calculated on channel y is kept stored in memory $A_{16}$ until then and transfered into memory $A_7$ by Sw17. The calculation made at the next cycle by integrator $A_8$ on the channel y takes therefore account of the scale factor previously calculated from the same channel. During the latter cycle, the scale factor calculated on channel y is taken out by Sw16 and stored in memory $A_{16}$, whereas the scale factor of the next channel z is transferred on $A_7$ by Sw19 for the calculation of the next cycle on channel z.

The device according to the invention provides possibility to measure the flow speed of a fluid with a high accuracy independently of the sound celerity variations in said fluid.

A particularly interesting application may be the manufacturing of a current-meter with two pairs of probes at right angles whose respective signals are processed by multiplexing, this allowing eventually the possibility not to limit the invention to two measuring directions but to "$n$" measuring channels by using one calculation circuit only.

What we claim is:

1. A device for measuring the flow speed of a fluid, comprising at least a pair of electro-acoustic transducers placed in the fluid, means generating a pulse train for triggering said transducers, each operating as a transmitting probe, to transmit simultaneously a succession of acoustic waves during a time interval shorter than the time interval taken by the acoustic waves to travel between said transducers, transforming means for processing respectively the received electric signals delivered by each of said transducers operating as receiving probes, in order to get information representing the phase difference between the received signals delivered by one of said receiving probes and the received signals delivered by the other receiving probe, said transforming means comprising:

a first integrator which integrates a reference voltage between moments 0, corresponding to the beginning of the transmission time interval, and $t_1$, or $t_2$ if $t_2 < t_1$, $t_1$ and $t_2$ representing the propagation times of the acoustic waves from one probe to the other in both directions, said reference voltage being switched to the input of said first integrator by an analog switch;

a second integrator which integrates the output voltage of said first integrator switched to the input of said second integrator by analog switches between 0 and $t_1$, or $t_2$ if $t_2 < t_1$, with a time constant $\tau/2$, and between $t_1$ and $t_2$, or $t_2$ and $t_1$ if $t_2 < t_1$, with a time constant $\tau$;

a third integrator which integrates the output voltage of said second integrator switched to the input of said third integrator by analog switches between 0 and $t_1$, or $t_2$ if $t_2 < t_1$, with a time constant $\tau_1$, between $t_1$ and $t_2$, or $t_2$ and $t_1$ if $t_2 < t_1$, with a time constant $\tau_2$, and until moment $\theta$ with a time constant $\tau_3$, where moment $\theta$ is determined by the comparison of the output voltage of said third integrator with a reference voltage by a comparator, the time constants $\tau_1$, $\tau_2$, $\tau_3$, being chosen so as to cancel at the output of said third integrator the terms in $t_1^3$ and $t_1 t_2^2$, or $t_2^3$ and $t_2 t_1^2$ if $t_2 < t_1$, and to keep the terms in $t_1 t_2 \theta$;

a trigger circuit for developing a square wave pulse of life time $0 - \theta$;

a fourth integrator which integrates a reference voltage between moments 0 and $\theta$ and develops an output voltage proportional to $K/t_1 t_2$;

a memory unit for storing the output of said fourth integrator after a time lag greater than the maximum duration of $0 - \theta$;

a fifth integrator which receives square wave pulses modulated in amplitude by the output of said fourth integrator stored in said memory unit and in width by $\Delta t = t_2 - t_1$, or $t_1 - t_2$ if $t_2 < t_1$, and which supplies an output voltage proportioned to the product $K \Delta t / t_1 t_2$ an amplifier responsive to the output from said fifth integrator for performing a scaling operation which, after a time greater than the maximum propagation time, is sampled and stored on an output corresponding to a measuring channel for one of said transducer pairs.

2. A device according to claim 1, comprising a plurality of pairs of electro-acoustic transducers, a plurality of corresponding pulse train generating means and having a plurality of circuits connected in parallel between said fourth integrator and said memory unit, each of said circuits comprising an analog switch and an intermediate memory, thus allowing the measuring of the flow speeds on a plurality of channels with a single measuring device.

* * * * *

UNITED STATES PATENT OFFICE
CERTIFICATE OF CORRECTION

PATENT NO. : 4,114,438
DATED : Sep. 19, 1978
INVENTOR(S) : Jean-Max Muraz; Michel Payre; Pierre Rampin, all of Valence, France It is certified that error appears in the above-identified patent and that said Letters Patent are hereby corrected as shown below:

(30)   Foreign Application Priority Data

December 10, 1975 (FR)   France           75 37893

Signed and Sealed this

Eighteenth Day of September 1979

[SEAL]

Attest:

Attesting Officer

LUTRELLE F. PARKER
Acting Commissioner of Patents and Trademarks